United States Patent [19]

Warren et al.

[11] Patent Number: 5,127,728
[45] Date of Patent: Jul. 7, 1992

[54] COMPACT PRISM SPECTROGRAPH SUITABLE FOR BROADBAND SPECTRAL SURVEYS WITH ARRAY DETECTORS

[75] Inventors: David W. Warren, Los Angeles; John A. Hackwell, Rancho Palos Verdes, both of Calif.

[73] Assignee: The Aerospace Corporation, El Segundo, Calif.

[21] Appl. No.: 467,063

[22] Filed: Jan. 18, 1990

[51] Int. Cl.⁵ .............................................. G01J 3/12
[52] U.S. Cl. .................................. 356/302; 356/326; 356/331
[58] Field of Search ............................ 356/330–333, 356/326, 302; 350/168

[56] References Cited

U.S. PATENT DOCUMENTS 1,007,346 10/1911 Féry ..................................... 356/302
3,626,615 3/1970 Wilson ................................. 356/331

FOREIGN PATENT DOCUMENTS 625906 5/1927 France ................................ 356/302

Primary Examiner—F. L. Evans
Assistant Examiner—K. P. Hantis
Attorney, Agent, or Firm—William J. Burke

[57] ABSTRACT

A device for the spectral dispersion of light suitable for use in a spectrographic mode with arrays of solid state photo-detectors. Light from an entrance aperture passes through a dispersing prism with two curved, refracting surfaces both operating near their aplanatic conjugates. After being reflected by a concave mirror located behind the prism, light returns through the prism in the opposite direction, the refractions at each face again being nearly aplanatic. Spectrally dispersed images of the entrance aperture are formed on a plane well separated from the entrance aperture and nearly normal to the incident light rays. Good image quality is maintained over a broad range of operating wavelengths simultaneously, allowing large spectral intervals to be surveyed without moving any of the elements of the system.

10 Claims, 5 Drawing Sheets

COMPACT PRISM SPECTROGRAPH SUITABLE FOR BROADBAND SPECTRAL SURVEYS WITH ARRAY DETECTORS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates to spectrographs, particularly spectrographs used to cover large spectral intervals.

2. Description of the Prior Art

A spectrograph is designed to form a spectrally dispersed image of an entrance aperture on a flat, accessible focal surface, where the entire image of the spectrum may be recorded simultaneously with a photographic plate or a high-efficiency array of solid-state detectors. Because this problem has been central to many branches of scientific research for decades, hundreds of designs exist to perform the same function.

A critical feature of the design of any spectrograph is the dispersing element. Two broad classes of spectrographs may be defined according to the type of dispersing element employed: a prism or a diffraction grating. Because diffraction gratings can cover no more than a one octave spectral interval (a factor of two in wavelength interval) without the problem of overlapping orders, diffraction gratings are not suited to an application that requires that a large spectral interval be covered simultaneously without moving any of the optical elements or the detector in the spectrograph. In contrast, prism spectrographs are particularly suitable for surveying unknown spectra, where large spectral intervals need to be covered efficiently, without ambiguity, but at a relatively low resolving power.

One definition of spectrograph resolving power that is useful in the case of an array detector is the ratio of the central wavelength seen by a given detector to the change in wavelength which causes the signal on that detector to fall to one half of its value at the central wavelength (Full Width at Half Maximum).

Prism spectrographs can be further distinguished based on the nature of the elements used to perform two necessary functions: dispersing and reimaging the incident energy. Configurations in which one or two elements perform both functions are rare, but usually result in compact instruments because of the reduced number of optical elements. Fewer parts usually means improved mechanical stability and optical transmission efficiency. Fewer parts also means reduced size and weight. These features are particularly important in applications involving cryogenic instruments or spacecraft instruments.

The prior art discloses folded prism spectrographs in which aplanatic refractions are used to minimize the optical aberrations of the system. Aplanatic refractions are refractions that introduce no spherical aberration or coma. For example, U.S. Pat. No. 2,866,374, issued to Lewis and Thomas, discloses a "Monochromator" and Wilson, U.S. Pat. No. 3,625,615, discloses "A Device for Spectral Dispersion of Light Employing a Predispersion Prism and a Grating Monochromator". Both of these devices provide examples of folded prism spectrographs with aplanatic surfaces in which the functions of dispersing and reimaging are combined into one or two elements.

The previous work by Lewis and Thomas and by Wilson concentrated on monochromators, a very specific and basic form of spectrograph. Monochromators are intended to image only one wavelength at a time. A mechanical motion is used to scan an extended spectrum past a single detector. Because only one wavelength at a time needs to be in sharp focus, chromatic variations in image quality can also be compensated for with small adjustments in the Position and orientation of the optical elements. A flat focal plane is unnecessary. Finally, only a relatively small separation is required between entrance and exit apertures, sufficient only to permit light to be inserted and extracted from the device.

However, monochromators are too limited to perform well as spectrographs. A spectrograph must form good images simultaneously at all operating wavelengths, not just a single wavelength. Moreover, the surface containing these images should be flat so that solid state detector arrays can be used to record the spectrum. This surface should also be as nearly as possible perpendicular to rays incident on the focus in order to reduce reflection losses at the detector and to ensure that light falling on one part of array is not transmitted to another via multiple internal reflections. Normal incidence of the light also reduces problems with anamorphic magnification. Anamorphic magnification is a difference in focal length along and perpendicular to the direction of dispersion and can result in non-optimal use of the elements in a detector array. Finally, the physical dimensions of the detector array in the spectrograph and its mounting typically require a significant separation between the entrance aperture and the dispersed images.

Therefore, the principal object of the present invention is to provide a spectrograph capable of simultaneously surveying more than a one octave spectral interval at a low (20–100) resolving power. Another object of the present invention is to provide a spectrograph capable of producing good image quality over a broad range of operating wavelengths simultaneously. Another object is a spectrograph with a flat focal surface nearly normal to the incident light and well separated from the entrance aperture. Another object of the Present invention is to provide a spectrograph with high optical throughput, with an f-number faster than f/3. Yet another object is to provide a spectrograph consisting of elements with easy-to-fabricate spherical surfaces. Another object is to provide a spectrograph in which all detectors in the spectrograph view an object through the same aperture, thereby preventing variations in source position and intensity with time from introducing any ambiguities into the spectra.

SUMMARY OF THE INVENTION

The present invention discloses a novel design for a low-resolution curved prism spectrograph that is capable of covering considerably more than a one octave spectral interval without scanning, at low resolution (20–100). The spectrograph has no moving parts and uses one or more unique curved prisms to disperse radiation onto one or more multi-element arrays of infrared detectors.

DETAILED DESCRIPTION OF THE PREFERRED EMBODIMENT

The central element of this invention is a prism with two spherical refracting surfaces. In contrast to prior art inventions, both refracting surfaces of the prism operate near their aplanatic conjugates.

Figure 1:
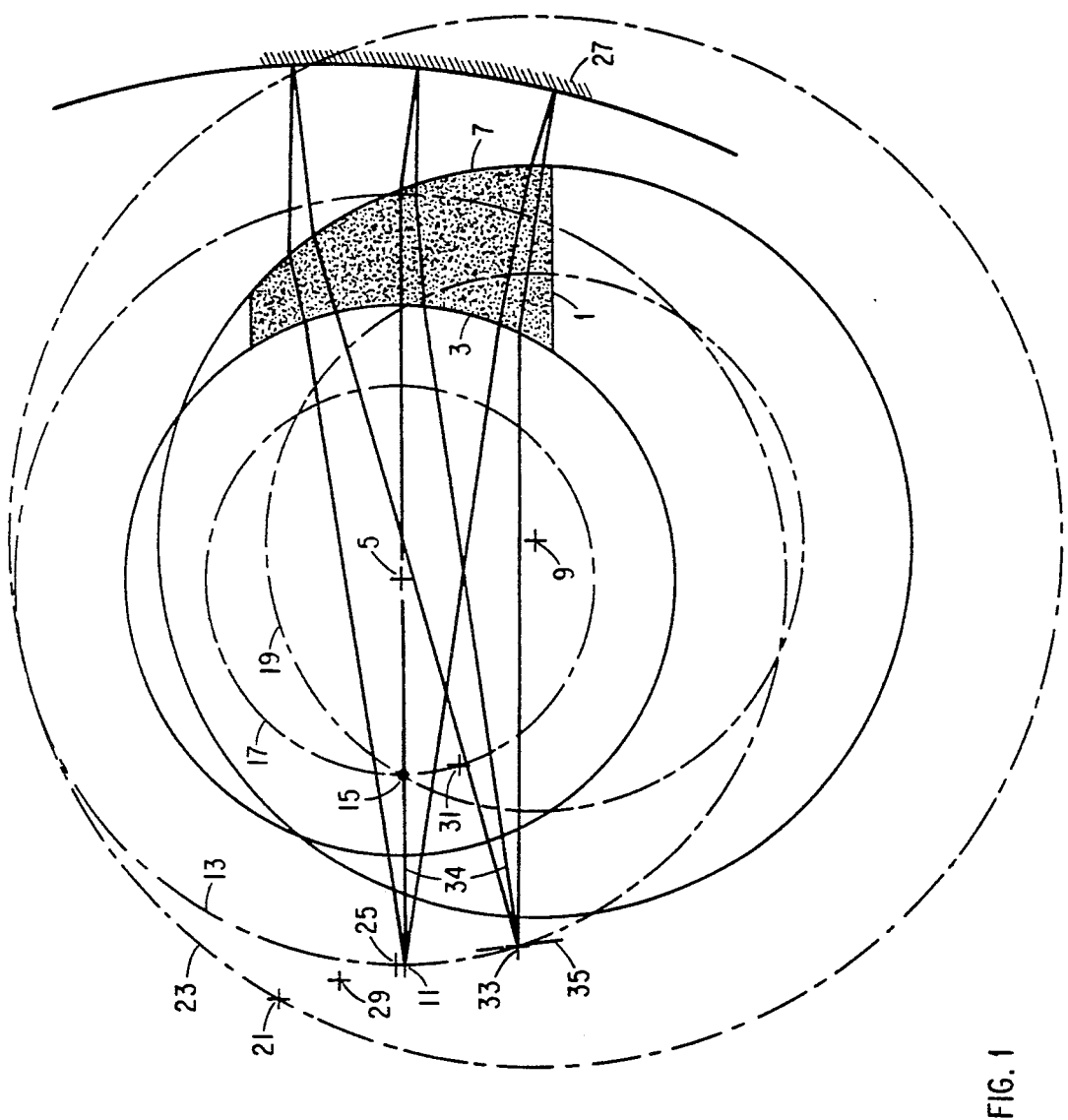
FIG. 1 is a schematic of a single-channel embodiment of the present invention.

Referring to FIG. 1, a prism 1 is formed by a volume of material of refractive index n, contained between two spherical surfaces. The first surface 3 is centered at 5 and has a radius of curvature R1. The second surface 7 is centered at point 9 and has radius of curvature R2. The object 11 (usually the entrance aperture of the spectrograph) is located near the outer aplanatic conjugate 13 for the first prism face 3. If the incident medium is air, the outer aplanatic conjugate of surface 3 is a circle of radius $n \times R1$ which is also centered at 5. The first surface 3 therefore forms a virtual image 15 of the object near its inner aplanatic conjugate 17 a distance $R1/n$ from the center of curvature 5. In other words, light diverging from the object 11 appears to originate from 15 after refraction by 3.

Note that 15 also lies at the intersection of 17 with 19, the inner aplanatic conjugate for the second prism face 7. The inner aplanatic conjugate 19 is a circle of radius $R2/n$ centered at 9. The second surface 7 then forms a second virtual image 21 at its outer aplanatic conjugate 23. The outer aplanatic conjugate 23 is a circle of radius $n \times R2$ also centered at 9. Light exiting the prism therefore appears to come from 21.

The image is next relayed to 25 by a concave mirror 27 whose center of curvature 29 is situated approximately halfway between 21 and 25. Light reflected by the mirror 27 is now converging towards 25. The reflected light again encounters the second prism face 7 and is focused towards a fourth virtual image 31. Finally, the first prism face 3 forms a real image of 31 at the final image point 33. Points 31 and 33 are near the aplanatic conjugates for the first prism face 3. The path of light rays 34 is shown for a single wavelength near the center of the spectral interval to be covered. For other wavelengths, the change in refractive index of the prism material causes small perturbations in the locations of the virtual images. The net effect is a shift in the location of the final image 33 with wavelength producing a spectrum on a focal plane 35 nearly perpendicular to the direction of the incident light.

Figure 2:
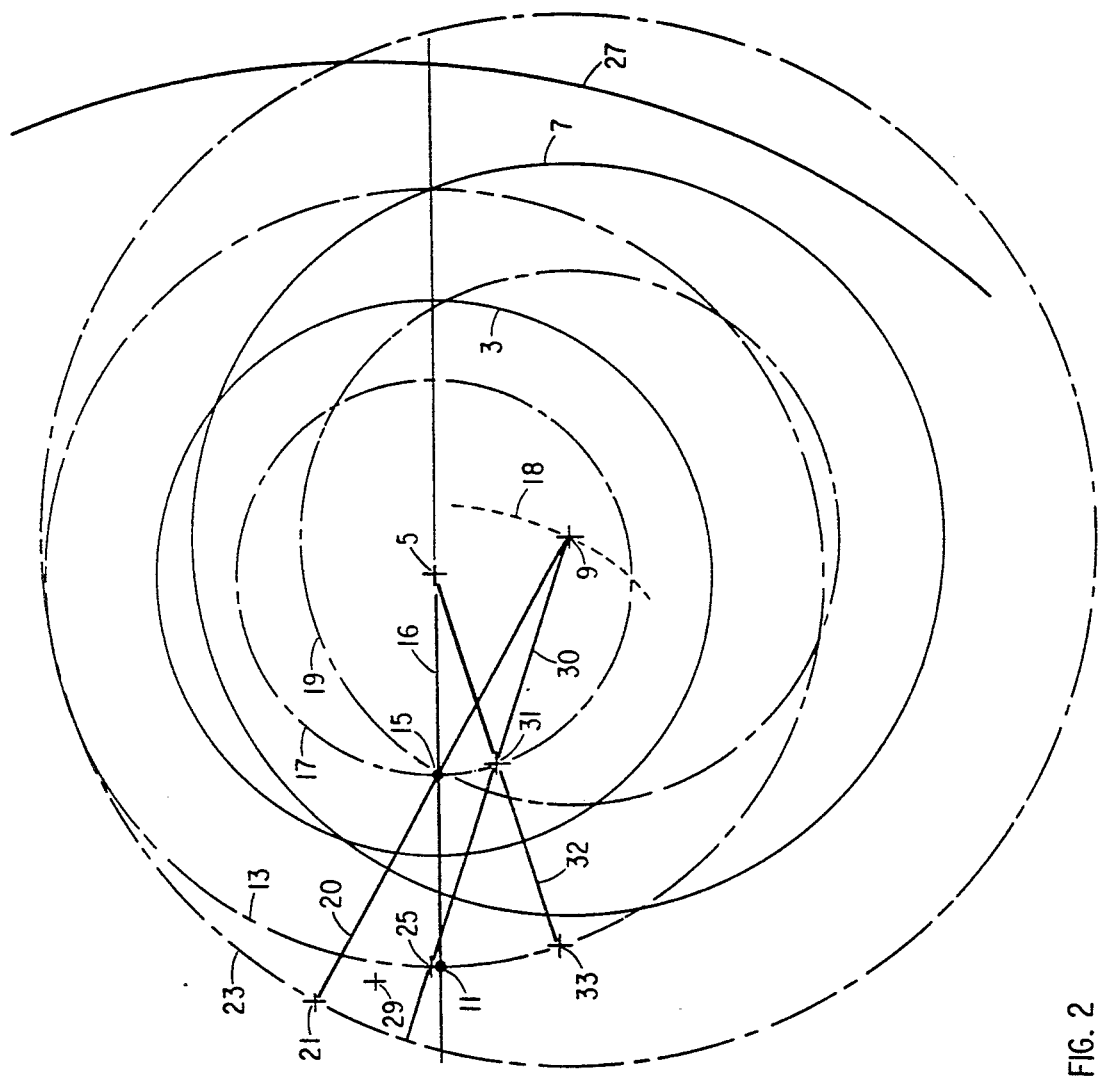
FIG. 2 is a schematic illustrating the first-order design of a single-channel embodiment of the present invention.

Referring to FIG. 2, the first-order layout of the device proceeds in practice as follows:

First, the radius of curvature R1 of the first prism surface 3 is chosen and the aplanatic conjugates 13 and 17 are defined given the refractive index n of the prism material. The object 11 and its first virtual image 15 lie on a line 16 passing through the center of curvature 5 of the first prism face 3.

Second, the separation between the object 11 and the final image 33 is chosen. The fourth virtual image 31 then lies at the intersection of the inner aplanatic conjugate 17 with a line 32 connecting the final image 33 and the center of curvature 5 of the first prism surface 3.

Third, the radius of curvature R2 of the second prism surface 7 is chosen and the aplanatic conjugates 19 and 23 are defined. In order for the first virtual image 15 to fall on the inner aplanatic conjugate 19 of the second prism surface 7, the center of curvature 9 of the second surface 7 is constrained to lie on an arc 18 of radius $R2/n$ centered on 15. The separation between the two centers of curvature 5 and 9 affects the dispersive power of the system.

Fourth, the second virtual image 21 is located at the intersection of the outer aplanatic conjugate circle 23 of the second prism face 7 with a line 20 passing through the first virtual image 15 and the center of curvature 9 of the second Prism face 7.

Fifth, the third virtual image 25 is located on a line 30 passing through the fourth virtual image 31 and the center of curvature 9 of the second prism face 7. The locations of 31 and 25 with respect to 9 are determined by the well-known laws of refraction.

Sixth, the center of curvature 29 of the reflecting mirror 27 is placed so that the second virtual image 21 is relayed to the third virtual image location 25. The radius of curvature of the reflecting mirror is chosen to give adequate separation between the mirror and the second prism face 7.

Seventh, for optimal performance, a computerized optical design code can be used to balance residual system aberrations over the wavelengths of interest. We have found that the above procedure produces a starting solution which allows the Program to converge rapidly to a good solution.

The choice of prism material is dictated by the need for transmission and dispersion (change in refractive index with wavelength) in the waveband of interest. At visible wavelengths, a glass prism and silicon charge-coupled-device (CCD) may be combined to form a highly efficient instrument. In the ultraviolet, fused silica or magnesium fluoride would be appropriate prism materials. In the infrared, materials such as calcium fluoride, sodium chloride, magnesium oxide, potassium chloride, and potassium bromide are suitable, depending on the wavelength.

Figures 3A, 3B:
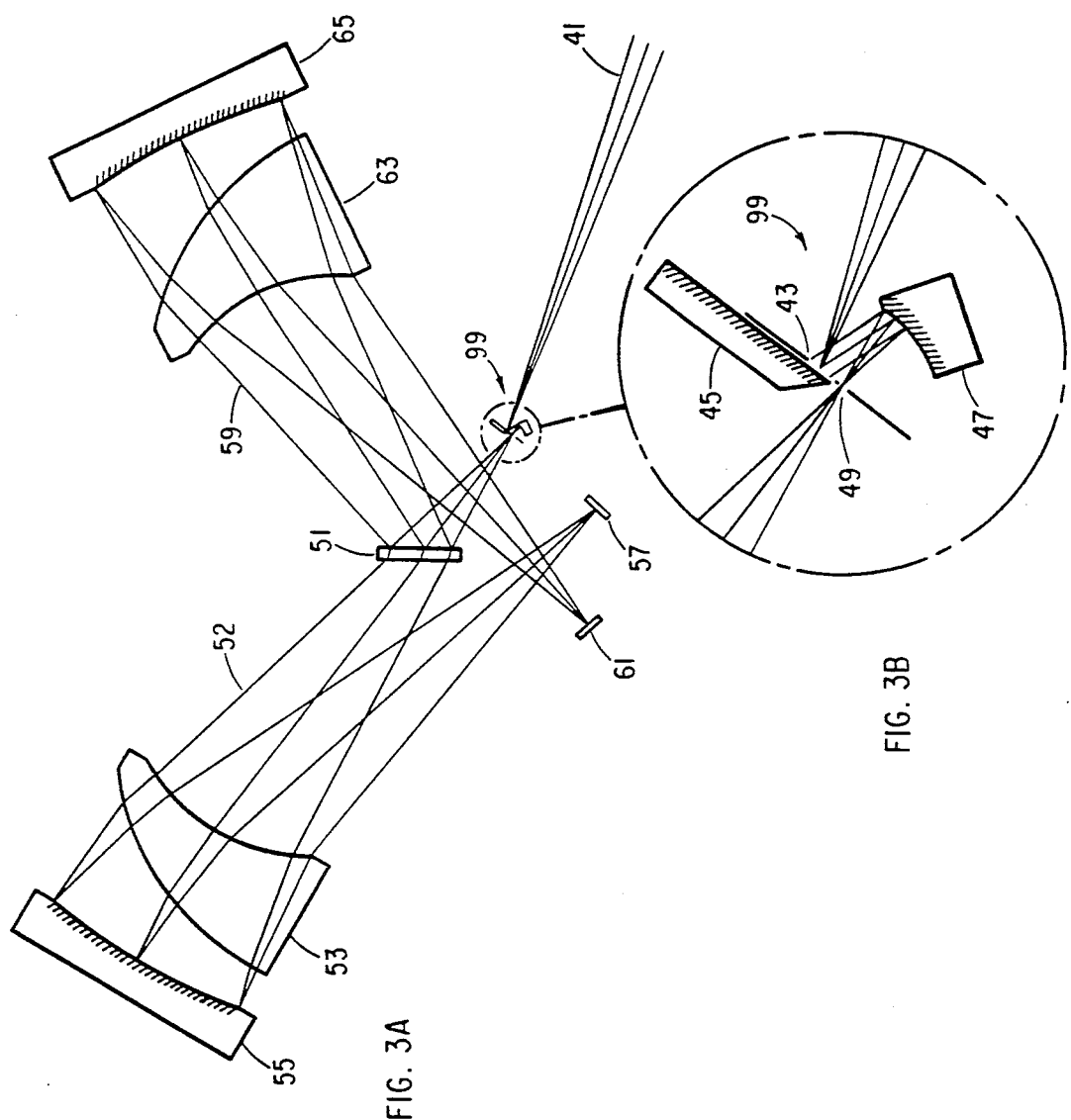
FIG. 3a is a schematic of a two-channel embodiment of the present invention.
FIG. 3b is a detailed schematic of the field optics.

FIG. 3a and FIG. 3b illustrate one way in which multiple prisms of the type described may be combined to extend the wavelength coverage of a spectrographic instrument. The device illustrated has been constructed to attach to an astronomical telescope for observations at infrared wavelengths from 2.9 to 13.5 micrometers. It was described in a paper presented at SPIE in January 1989. Light from the telescope 41 comes to a focus at an aperture 43 which defines the portion of the sky to be observed. A mirror 45 immediately behind the aperture reflects the light towards a concave field mirror 47. The field mirror forms an image of the telescope objective at an aperture stop 49 which is the entrance to the spectrographic part of the instrument. The purpose of the field optics 99, as illustrated in FIG. 3b, is to insure that small motions of an object in the field of view do not produce variations in the output signal due to motion on the detectors. It is not central to the operation of the spectrographic part of the instrument. The light next encounters a spectral beamsplitter 51 which transmits wavelengths between 6.5 and 13.5 micro-meters and reflects wavelengths between 2.9 and 6.5 micro-meters. The transmitted light 52 is dispersed and reimaged by a sodium chloride prism 53 employed in concert with a concave reflecting mirror 55 according to the preferred embodiment described above. The dispersed spectrum for this channel is recorded by an array of 58 infrared-sensitive detector elements 57. The reflected light 59 is similarly dispersed and reimaged onto a second 58-element array 61 by a calcium fluoride prism 63 and reflecting mirror 65.

Novel features of the present invention include dispersing Prisms with two curved refracting surfaces, both operating near their aplanatic conjugates and flat dispersed image surfaces well separated from the entrance aperture and nearly normal to the incident light beams. A mild, rotationally symmetric conic figure can be used on the concave mirrors to improve optical image quality and provide increased tolerance to misalignment. In addition, the concave prism surface and the concave mirror surface in each channel can be co-axial to simplify optical alignment.

In the course of optimization, we found it possible to manipulate the mechanical constraints to a surprisingly large degree while maintaining acceptable images. This tolerance is a well-known fringe benefit of solutions based on aplanatic foundations. A detailed analysis of the design confirmed that normal optical and mechanical shop tolerances would ensure acceptable performance. We found that tolerances which affect the air space between the second prism face and the mirror are the most critical, although we determined that the effects of known fabrication errors (e.g. radius and thickness) could be compensated for during assembly. We also found that a significant fraction of tolerance-induced error (e.g. spacing errors introduced by assembly or thermal effects) could be compensated for by focusing and tilting the focal plane.

Specification for the manufacture of the crystal prisms was of particular concern because of their unconventional shapes and the general balkiness of the materials used. We were able to simplify the prism geometries by requiring that the cylindrical edges of the prisms be coaxial with and centered on the concave faces. This has allowed the prisms to be fabricated in a relatively straightforward way using conventional optical shop practices whose accuracy can be verified by simple mechanical means (e.g. using dial indicators).

The initial solutions achieved adequate image quality using only spherical surfaces on the prisms and mirrors. Image quality was further improved by allowing the mirrors to become oblate spheroids of 2–4 waves departure from the best fitting sphere (at 632.8 nm). The additional performance margin can be used to provide increased tolerance to misalignment. Because this sort of asphericity is not difficult for the optician to achieve or test, we opted to include it in both channels. As a consequence, the mirrors became uniaxial. We took advantage of the design's tolerance to reoptimize, constraining the centers of curvature of the first prism faces to lie on the axes of the mirrors. These axes are also coincident with the axes of the cylinders describing the edges of the prisms. The prisms and mirror in each channel can therefore be adjusted to common axes as defined, for example, by an alignment telescope.

Figure 4:
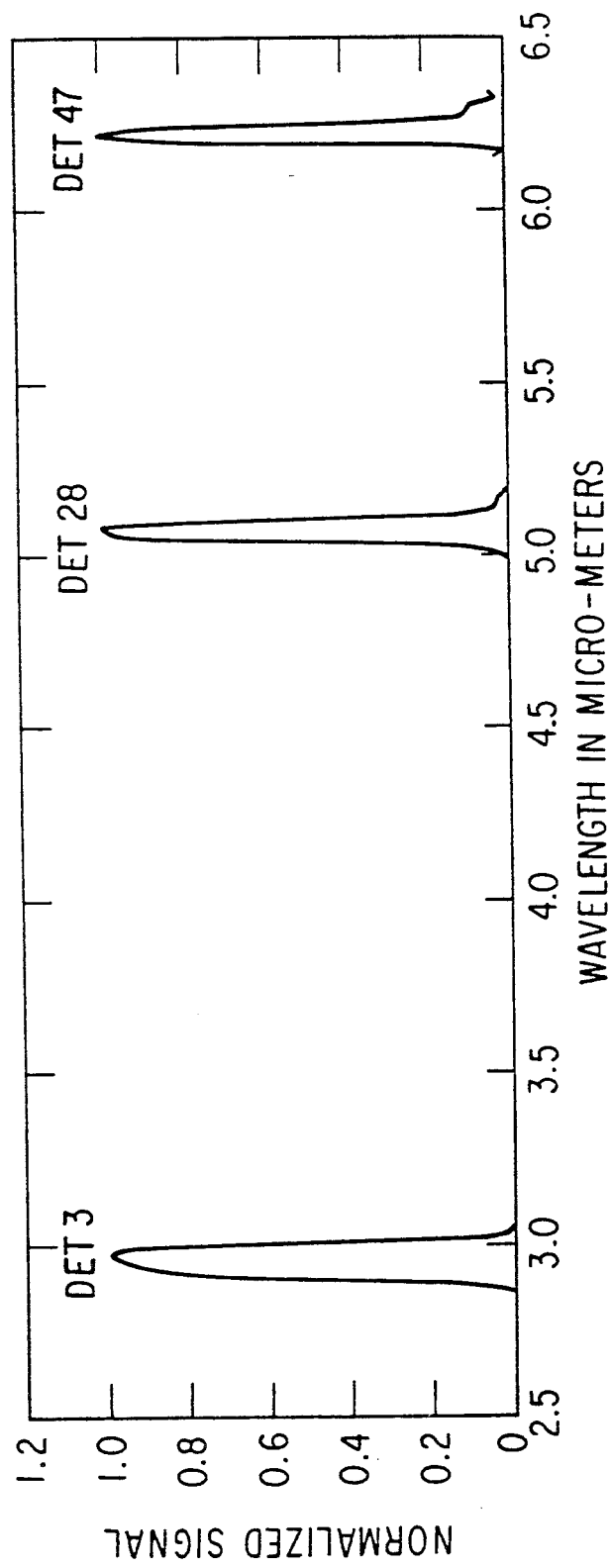
FIG. 4 exhibits the experimentally measured performance of the present invention.

FIG. 4 shows data taken from the operational instrument. The signals from three typical detectors selected from the shorter wavelength array (61 of FIG. 2) are plotted as a function of wavelength. The figure shows that each of the detectors responds only to a relatively narrow range of wavelengths as required by the design. The resolving power, as measured by the ratio of the center wavelength to the full width at half maximum signal of the spectral bandwidth, varies from approximately 25 at 2.9 micro-meters (Detector 3) to 75 at 5.1 micro-meters (Detector 28) to 120 at 6.25 micro-meters (Detector 47). These results typify the performance of other detectors on the array.

Figure 5:
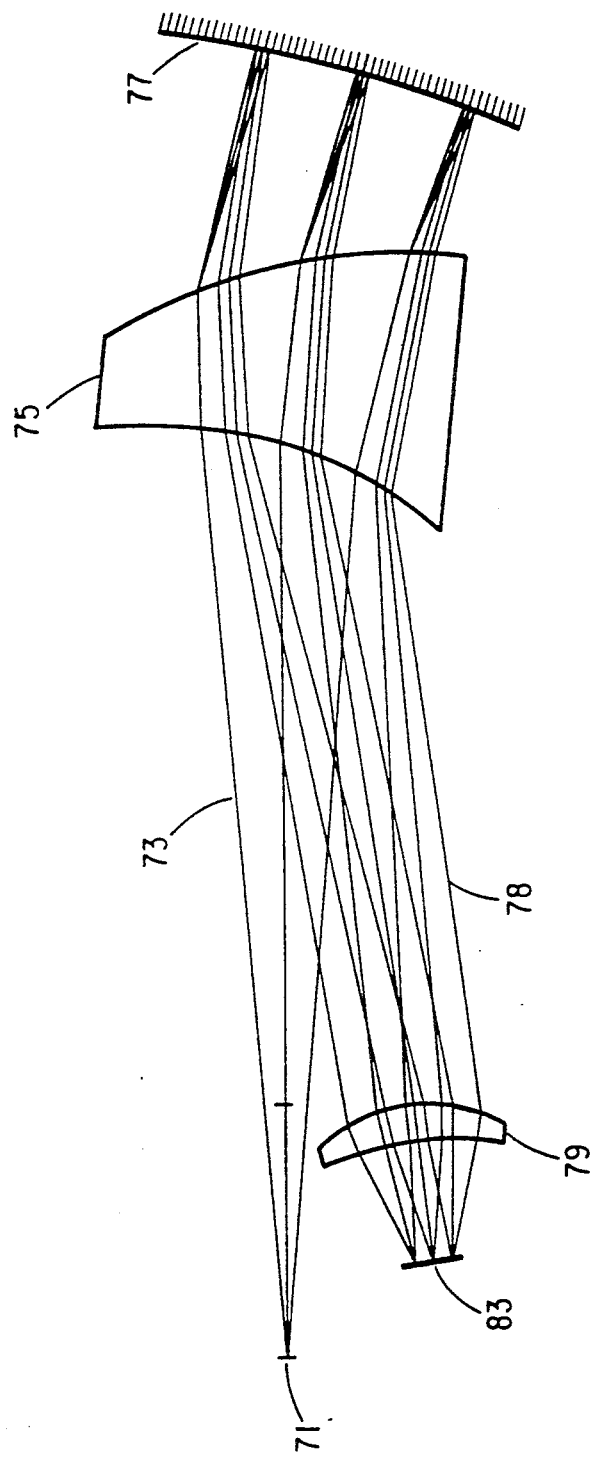
FIG. 5 is a schematic showing an embodiment of the present invention which employs an additional lens to alter the magnification of the system.

The embodiments discussed above operate at close to 1:1 magnification between object and image. FIG. 5 illustrates how other magnifications may be obtained by inserting an additional lens in the optical path. This may be necessary, for example, to match telescope image scale to the size of available detectors. In this example, light from the object 71 diverges at a relatively slow focal ratio (f/number) 73. It is dispersed and reimaged by a prism 75 and mirror 77 according to the double aplanatic principle described above. Before coming to a focus, the dispersed beams 78 encounter a lens 79 which changes the effective focal length of the system. In the case illustrated, the lens has positive optical power, producing a demagnified spectrum at 83. An additional benefit of this particular configuration is that overall image quality is improved because the prism operates in a less divergent (slower f/number) beam.

From the foregoing description of a specific embodiment illustrating the fundamental features of the invention, it will now be apparent to those skilled in the art that the invention may be accomplished in a variety of forms without departing from the spirit and scope thereof. Accordingly, it is understood that the invention disclosed herein is a preferred embodiment thereof and that the invention is not to be limited thereby, but only by the appended claims.

We claim:

1. A device for spectral dispersion of light from an object and incident on a focal plane comprising:
   a) a dispersing prism with first and second curved spherical refracting surfaces, each surface possessing an inner and an outer aplanatic conjugate;
   b) a focal plane well separated from the object and nearly normal to the incident light;
   c) the first curved surface, being arranged to form a virtual image of the object at the position of the inner aplanatic conjugate of the first surface and to relay a fourth virtual image to the position of the focal plane;
   d) the second curved surface, being arranged such that its inner aplanatic conjugate circle intersects the inner aplanatic conjugate for the first curved surface at a first virtual image point, and such that the surface relays the first virtual image to a second virtual image point and relays a third virtual image to the fourth virtual image point;
   e) a curved spherical mirror, being arranged to relay the second virtual image to the third virtual image point;
   f) whereby light from the object is spectrally disposed and refocused on the focal plane.

2. The device as claimed in claim 1 where a mild, rotationally symmetric conic figure is located on the mirror.

3. The device as claimed in claim 1 where center of curvature of the mirror, the center of curvature of the first curved prism surface, the physical center of the mirror and the physical center of the first curved prism surface are constrained to lie on a common axis, thereby simplifying alignment of the system.

4. The device as claimed in claim 1 where the first curved surface is concave.

5. The device as claimed in claim 1 wherein a lens is inserted between the prism and the focal plane, thereby changing the magnification between the object and the focal plane.

6. A device for spectral dispersion of light diverging from an object and incident on a focal plane comprising:
 a) a spectral beamsplitter designed to reflect light in one spectral interval and to transmit light in another spectral interval;
 b) a first dispersing prism with first and second curved spherical refracting surfaces, each surface possessing an inner and an outer aplanatic conjugate;
 c) a first focal plane well separated from the object receiving light from the object that has been reflected by the beamsplitter and dispersed by the first prism;
 d) the first curved surface on the first prism, being arranged to form a virtual image of the object at the position of its inner aplanatic conjugate and to relay a fourth virtual image to the position of the first focal plane;
 e) the second surface on the first prism, being arranged such that its inner aplanatic conjugate circle intersects the inner aplanatic conjugate for the first curved surface at a first virtual image point, that relays the first virtual image to a second virtual image point and relays a third virtual image to the fourth virtual image point;
 f) a first curved spherical mirror behind the first curved prism, being arranged to relay the second virtual image to the third virtual image point;
 g) a second dispersing prism with first and second curved spherical refracting surface, each surface possessing an inner and an outer aplanatic conjugate;
 h) a second focal plane well separated from the object and the first focal plane, receiving light from the object that has been transmitted by the beamsplitter and dispersed by the second prism;
 i) the first curved surface on the second prism, being arranged to form a virtual image of the object at the position of its inner aplanatic conjugate and to relay a fourth virtual image to the position of the second focal plane;
 j) the second curved surface on the second prism, being arranged such that its inner aplanatic conjugate circle intersects the inner aplanatic conjugate for the first curved surface at a first virtual image point, and such that the surface relays the first virtual image to a second virtual image point and relays a third virtual image to the fourth virtual image point;
 k) a second curved spherical mirror behind the second curved prism, being arranged to relay the second virtual image to the third virtual image point;
 l) whereby light from the object is spectrally dispersed and refocused on to two focal planes, each of which views a different spectral interval.

7. The device as claimed in claim 6 where a mild, rotationally symmetric conic figure is located on each of the mirrors.

8. The device as claimed in claim 6 where, for each mirror and prism combination, the center of curvature of the mirror, the center of curvature of the first curved surface, the physical center of the mirror and the physical center of the concave prism face are constrained to lie on a common axis, thereby simplifying alignment of the system.

9. The device as claimed in claim 6 where the first curved surface of each prism is concave.

10. The device as claimed in claim 6 wherein a lens is inserted between each prism and each focal plane, thereby changing the magnification between the object and the focal plane.

* * * * *